US 7,035,365 B2

(12) United States Patent
Takatori et al.

(10) Patent No.: US 7,035,365 B2
(45) Date of Patent: Apr. 25, 2006

(54) ERROR CORRECTION METHOD AND APPARATUS FOR DATA TRANSMISSION SYSTEM

(75) Inventors: Hiroshi Takatori, Sacramento, CA (US); James M. Little, Sacramento, CA (US); Scott Chiu, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 816 days.

(21) Appl. No.: 10/001,712

(22) Filed: Mar. 11, 2002

(65) Prior Publication Data

US 2003/0169835 A1    Sep. 11, 2003

(51) Int. Cl.
*H04L 7/00*    (2006.01)
*H04L 7/02*    (2006.01)
(52) U.S. Cl. ...................... 375/371; 375/360
(58) Field of Classification Search ............... 375/287, 375/360, 371; 714/700, 709
See application file for complete search history.

(56) References Cited

U.S. PATENT DOCUMENTS

| 3,760,282 | A | | 9/1973 | Arnold et al. |
| 5,719,907 | A | * | 2/1998 | Kaku et al. ............. 375/371 |
| 6,084,931 | A | * | 7/2000 | Powell et al. ............ 375/355 |
| 6,549,604 | B1 | * | 4/2003 | Shenoi .................... 377/39 |
| 6,556,637 | B1 | * | 4/2003 | Moriuchi ................ 375/350 |
| 6,629,272 | B1 | * | 9/2003 | Jungerman .............. 714/704 |
| 2001/0016926 | A1 | * | 8/2001 | Riggle .................... 714/709 |

FOREIGN PATENT DOCUMENTS

| EP | 0296253 | 12/1988 |
| EP | 0594246 A1 | 4/1994 |
| WO | WO 9520843 | 8/1995 |

OTHER PUBLICATIONS

"LXT360 T1/E1 LH/SH Transceiver," [on-line], [retrieved Jan. 17, 2002], retrieved from the Internet: <URL:http://www/intel.com/design/network/products/wan/tecarrier/lxt360.htm>.
"LXT360—Integrated T1/E1 LH/SH Transceiver for DS1/DSC-1 or PRI Applications," Order No. 249031-001, Jan. 2001, pp. 1-54.

* cited by examiner

*Primary Examiner*—Young T. Tse
*Assistant Examiner*—Sam K. Ahn
(74) *Attorney, Agent, or Firm*—Pillsbury Winthrop Shaw Pittman LLP

(57) ABSTRACT

A receiver involved in high-speed data transmission includes a decision system. The decision system calculates a value of an input signal and holds the value as a tentative value. The decision system calculates an error value, amplifies the error value, and holds the amplified error value as a corrected value. The decision system determines whether the amplified error value is within a marginal range. The decision system also determines whether adjacent values to the value indicate the input signal was in transition from a positive to negative state, or a negative to positive state. If the amplified error values is within a marginal range and the input signal was in transition from a positive to negative state, or a negative to positive state, then the decision system overrides the tentative value with the corrected value.

24 Claims, 6 Drawing Sheets

Block Diagram of Error Corrector

Figure 1. Eye Pattern

PRIOR ART

Figure 2. Error Events in Eye Diagram

Figure 3. Block Diagram of the Entire Receiver

DECISION SYSTEM

Figure 5. Block Diagram of Error Corrector

ERROR CORRECTION METHOD AND APPARATUS FOR DATA TRANSMISSION SYSTEM

BACKGROUND OF THE INVENTION

1. Field of the Invention

The present invention generally relates to high-speed data transmission. More specifically, the present invention relates to correcting the jitter spectrum in a transmission system that requires stringent jitter tolerance over a wide range of jitter frequencies, such as the incoming signal of a 1.544 Megabit-per-second (Mbit) point-to-point dedicated, digital circuit (T1) system, which may have very large jitter due to the cascade of several T1 links in the network.

2. Discussion of the Related Art

Networking applications have become very popular in recent years, particularly in response to an explosion in the use and variety of networks employed in a vast array of computing environments. Accordingly, many advances have been made in the related technology in order to improve the quality of these networking systems. For example, fully integrated transceivers for T1 network channel service units (CSUs) and integrated services digital network (ISDN) primary rate interface applications are known in the art and are presently commercially available. These devices, such as the Intel LXT360 T1/E1 transceiver, are useful for networking applications, such as timing recovery in T1 network systems. However, there are obstacles that prevent such systems from providing better jitter tolerance—a desirable quality in communications networks and other networking applications. Such obstacles may include exceptionally large amplitude jitter, a wide variation in data density, large amounts of cable attenuation, and imperfect equalization.

Jitter is the general term used to describe the noise or uncertainty in the period of incoming data in a communications system. In an ideal system, bits arrive at time increments that are integer multiples of a bit repetition time. However, in a real-world system, data pulses arrive at times that deviate from these integer multiples. This deviation may cause errors in the transmission of data, particularly when the data is transmitted at high speeds. The deviation or variation may be in the amplitude, frequency, or phase of the data. Jitter may occur due to a number of causes, including inter-symbol interference, frequency differences between the transmitter and receiver clock, noise, and the non-ideal behavior of the receiver and transmitter clock generation circuits.

Jitter is a problem of particular import in digital communications systems. First, jitter causes the received signal to be sampled at a non-optimal sampling point. This occurrence reduces the signal-to-noise ratio at the receiver and thus limits the information rate. Second, in conventional systems, each receiver typically extracts its receive sampling clock from the incoming data signal. Jitter makes this task significantly more difficult. Third, in long-distance transmission systems, where multiple repeaters reside in a chain, jitter accumulates. That is, each receiver extracts a clock from the incoming bit stream, re-times the data, and re-transmits the data utilizing the recovered clock. Each subsequent receiver thus sees a progressively larger degree of input jitter.

When an incoming signal contains a large and high frequency jitter component, the receiver phase lock loop (RPLL) tends to lose its ability to accurately catch up to the incoming signal phase movement. When this RPLL misadjustment becomes larger than a certain amount of the symbol period, it causes symbol error. The phase misadjustment can be understood as the phase error of the recovered clock phase from that of the incoming signal. The timing margin is defined as the largest phase error that occurs without causing symbol error.

FIG. 1 illustrates this scenario in terms of the data decision instance margin. FIG. 1 is a superposition of possible signal traces for two symbol periods out of a long random sequence of data and is referred to as an eye diagram. The timing margin shown in FIG. 1 is from time T1 to T3, where T2 is the optimal decision instance. If the phase error causes the data decision to be made either before T1 or after T3, then the data decision might be erroneous. In that case, the receiver starts making errors due to inter-symbol interference. Generally, this occurs when the phase error exceeds 40% of the symbol period, which is to the left of time T1 and to the right of T3 in FIG. 1.

Accordingly, there is a need for an error correction method and apparatus that allows correction of symbol error even when phase error exceeds more than 40% of the symbol period. There is also a need for an error correction method and apparatus, to reduce error rates due to pattern jitter, having a simple implementation.

DETAILED DESCRIPTION

Figure 1:
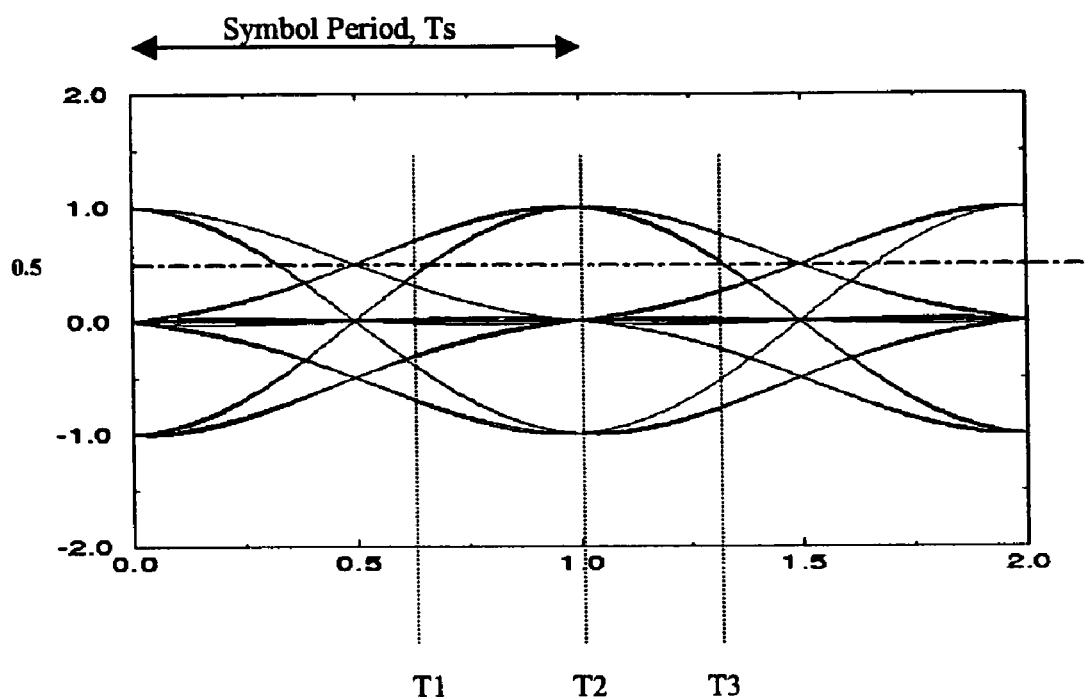
FIG. 1 illustrates a time domain eye diagram with signal traces for two symbol periods out of a long random sequence of data as is known in the prior art.
Figure 2:
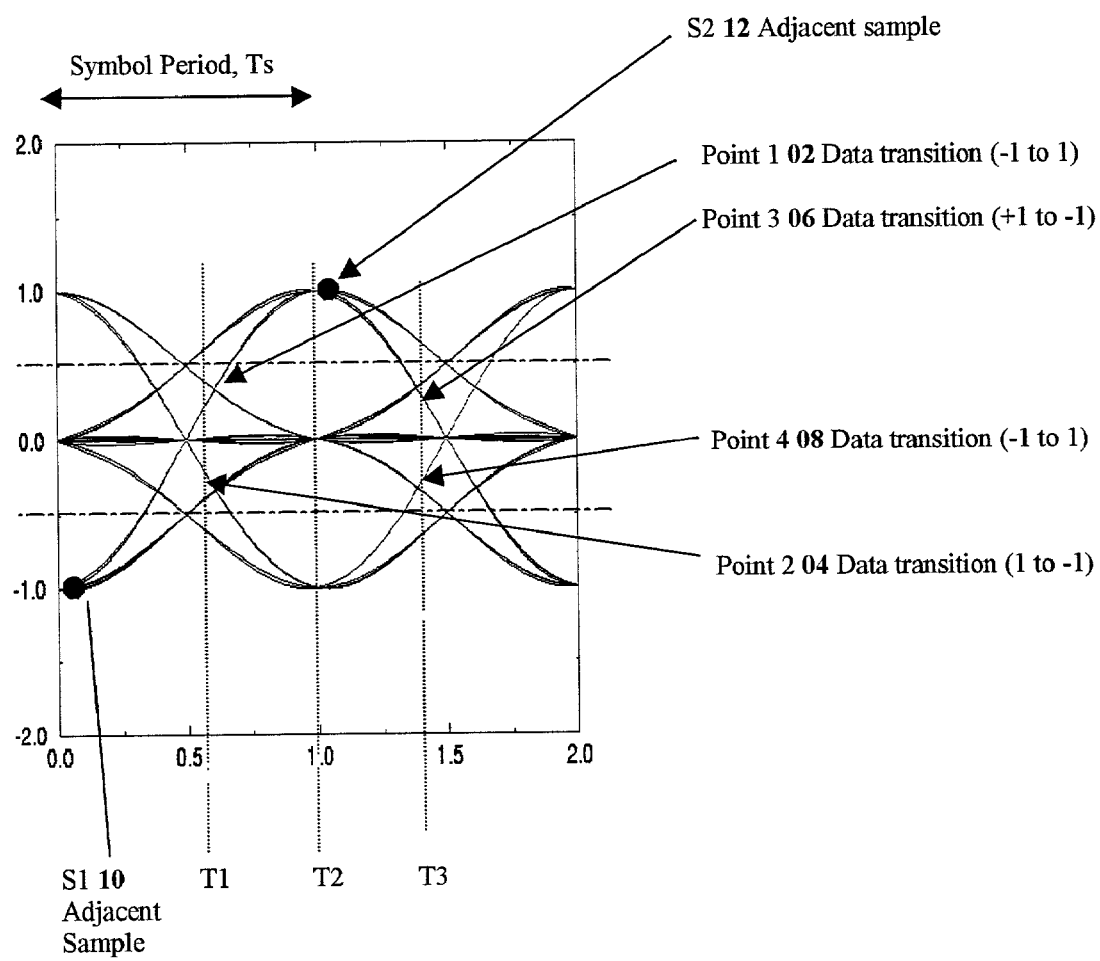
FIG. 2 illustrates a time domain eye diagram when the phase error exceeds 40% according to an embodiment of the present invention.

FIG. 2 illustrates a time domain eye diagram when the phase error exceeds 40% according to an embodiment of the present invention. Point 1 02 is where symbol error occurs when the data transition is from −1 to 1, and Point 2 04 is where symbol error occurs when the data transition is from 1 to −1. Points 1 02 and 2 04 both identify locations where the phase is off by approximately 40% of the symbol period, in this instance left of the center phase, T2. For example, the error event occurs when the data decision instance, which should be at T2 (t=1.0) and thus coded as a +1 value, is instead decided at T1 (t=0.6), where the amplitude is less than 0.5 and thus coded as a 0 value. Point 2 04 is the opposite polarity of the signal with the same phase as point 1 02.

An additional example of the error events that the present invention overcomes is identified in FIG. 2. Point 3 06 is the where the symbol error would occur when the data transition is from 1 to −1, and Point 4 08 is where the symbol error would occur when the data transmission is from −1 to 1. Points 3 06 and 4 08 both identify locations where the phase is off by approximately 40% of the symbol period to the right of the center phase, T2. The error event occurs when the data decision instance, which should be at T2 (t=0) and coded as a +1 value, is instead sampled at T3 (t=1.4) and therefore coded as a 0 value. Point 4 08 is the opposite polarity of the signal with the same phase error as Point 3 06.

In all four cases above and in most erroneous cases, the sampled value has an amplitude value that is approximately equal to 0.5. Generally, the sampled value when the phase error is small is close to either +1, 0, or −1. Therefore, a sampled value of 0.5 indicates a marginal condition and means phase error might occur. The present invention utilizes this information as the first indicator that phase error has occurred.

The present invention also confirms that a data value transition has occurred. The invention samples the values from the adjacent instances and evaluates these in order to verify that a data value transition is occurring within a symbol period. In FIG. 2, the spacing of the adjacent sampling phase is assumed to be one half of the symbol period as illustrated by samples S1 10 and S2 12. S1 10 and S2 12 are related to Point 1 02, where the data transition is supposed to be from a −1 value to a +1 value. If S1 10 and S2 12 are close to opposite values, for instance in this case −1 or +1, then the data transition from a −1 value to a +1 value is confirmed. Generally, the present invention utilizes the fact that most of the erroneous decisions due to sampling phase errors occur when the decision phase (where the data decision is made) is swapped with one or the other of the two adjacent sampling phases (e.g., T2 is swapped with T1 or T3). This occurrence is the second indicator that phase error has occurred. Thus, when both conditions are satisfied, meaning the data value is found to be marginal and a transition is occurring within the symbol period, then the data value is corrected.

Figure 3:
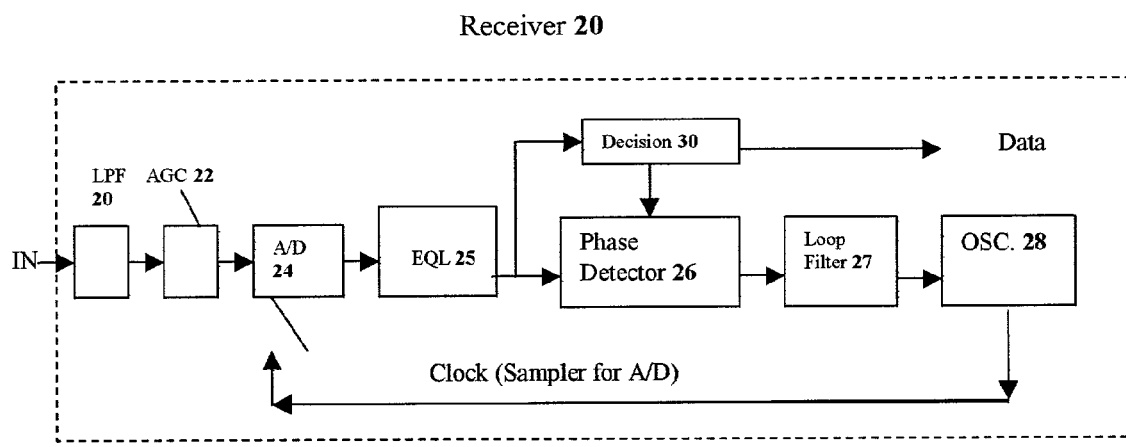
FIG. 3 illustrates a block diagram of a receiver according to an embodiment of the present invention.

FIG. 3 illustrates a block diagram of a receiver 20 according to an embodiment of the present invention. The receiver 20 accepts the incoming data stream and extracts the data and phase information from the incoming data stream. The incoming data stream is input to a band-limiting low pass filter (LPF) 21, whose output is input to an amplifier 22 where it is amplified with automatic gain control (AGC). The output of the amplifier 22 is sampled utilizing an analog-to-digital (A/D) converter 24.

The digital signal is then input to an equalizer (EQL) 25. The digital signal output from the equalizer 25 is input to a phase detector 26, where the phase information is extracted. The sampled digital output signal from the equalizer 25 is also input into a decision system 30, where a value of the equalized sampled signal is determined. The phase information generated by the phase detector 26 is filtered through a loop filter 27 and fed to the oscillator 28 to control the oscillator phase and frequency. The clock signal generated by the oscillator 28 is used as the sampling clock of the input signal for the A/D converter 24.

Figure 4:
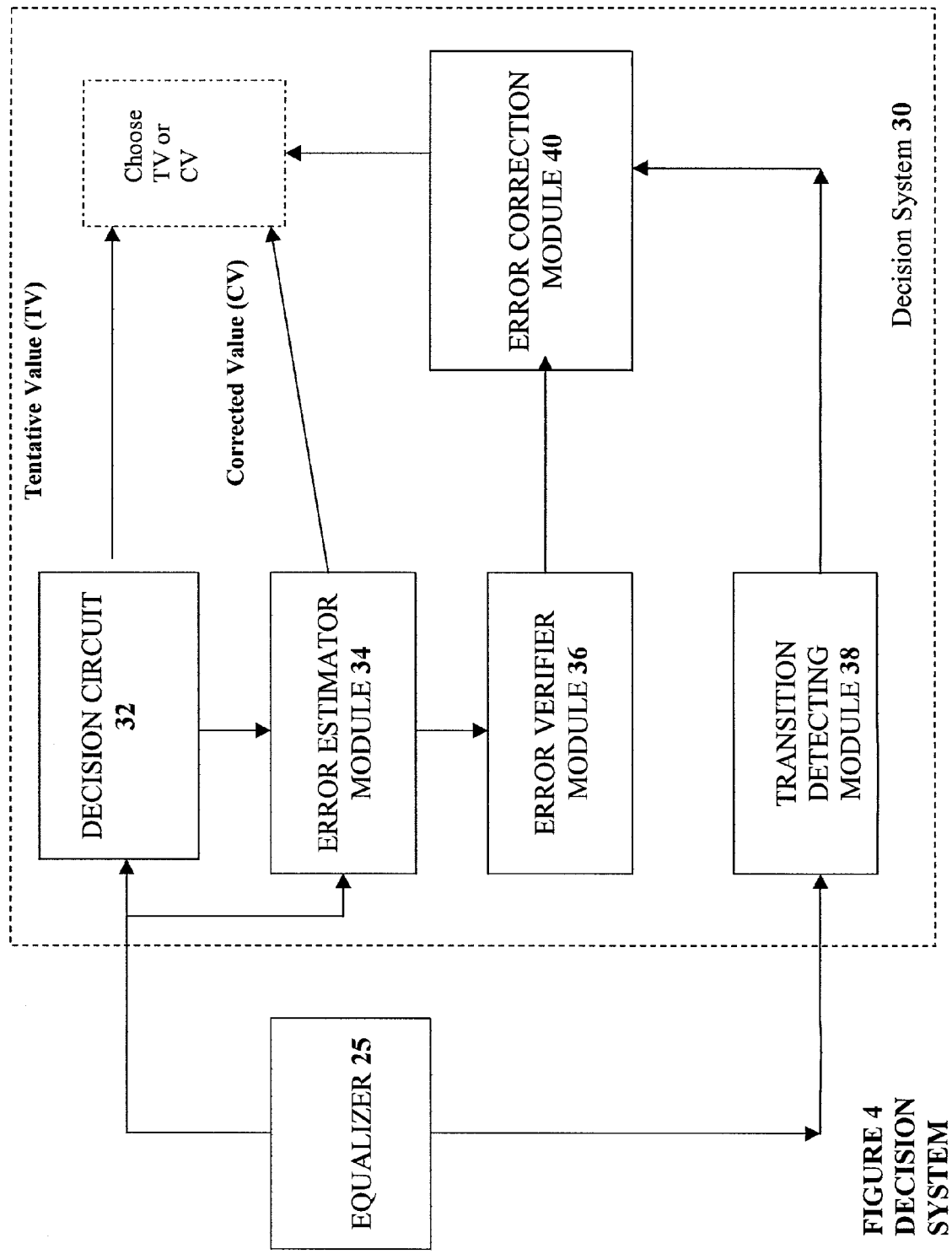
FIG. 4 illustrates a general block diagram of a decision subsystem according to an embodiment of the present invention.

FIG. 4 illustrates a decision system 30 according to an embodiment of the present invention. The decision subsystem 30 includes an initial decision circuit 32, an error estimator module 34, an error verifier module 36, a transition detecting module 38, and an error correction module 40. The sampled digital output from the equalizer 25 is input into the decision circuit 32, where the value of the sampled digital output is determined. The decision circuit's output value is the value output by the decision subsystem 30 if the error correction module 40 is not activated to change the value.

The value of the data output from the decision circuit 32 is input to the error estimator module 34. The error estimator module 34 subtracts the data value output from the decision circuit 32 from the data value input to the decision circuit 32. The output of the error estimator module 34 is then amplified to either 1 or −1 to represent the corrected error value, which will be used if an error has occurred and the error correction module 40 is activated. For example, if the error estimator module output is 0.3, then the output is amplified to 1. If the error estimator output is −0.2, then the output is amplified to −1.

The error estimator output is input to the error verifier module 36, which decides if the value of the signal is within a specified range. The error verifier module output is input to the error correction module 40. The error verifier module output is illustratively, a high signal if the value is found to be within the specified range.

The sampled digital output from the equalizer 25 is also input to the transition detecting module 38. Adjacent samples of the digital output are used by the transition detecting module 38. For example, adjacent phase samples are samples one-half a symbol period before and after the decision instance sample, as illustrated by points S1 10 and S2 12 in FIG. 2. The transition detecting module 38 determines if a full data transition (from a −1 value to a +1 value or from a +1 value to a −1 value) has occurred by evaluating if the adjacent phase samples are close to opposite normal values like −1 and 1. The output of the transition detecting module 38 is also input into the error correction 40. The output of the transition detecting module 38 is illustratively, high if the transition detecting module 38 determines a data value transition has occurred within the symbol period If the outputs of the transition detecting module 38 and the error verifier module 36 are, for example, both high, then the error corrector 40 sends the command to select the corrected value, rather than the tentative value.

Figure 5:
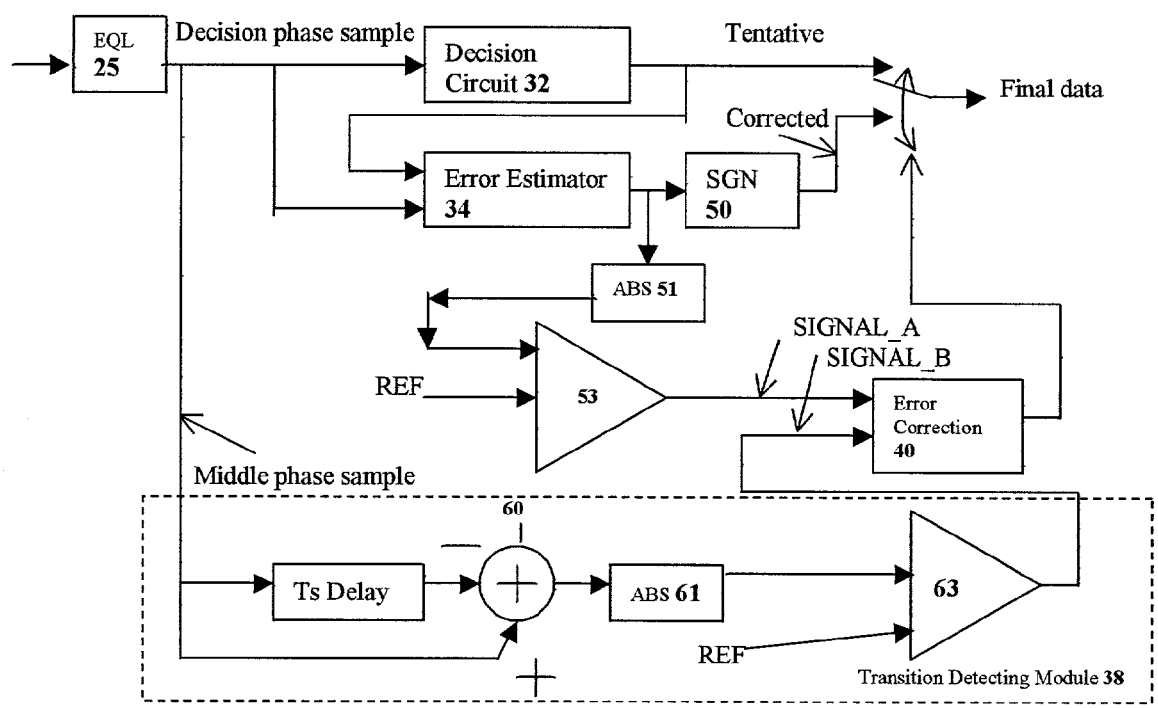
FIG. 5 illustrates a specific block diagram of a decision subsystem according to an embodiment of the present invention.

In one embodiment of the invention as illustrated in FIG. 5, the sampled digital output of the equalizer 25 is input to the decision circuit 32 which determines its value. In this embodiment, the decision circuit 32 determines if the output value is −1, 0 or +1. The output of the decision circuit 32 is held as the tentative value of the data, which value is used if the error correction module 40 is not activated.

The sampled digital output of the equalizer 25 is input along with the decision circuit's output value to the error estimator module 34. The error estimator module 34 calculates the error signal by subtracting the sampled digital output value from the equalizer 25 from the decision circuit's output value. The error estimator module output value is sent through a Signed Boolean (SGN) circuit 50, which amplifies all negative values to −1 and amplifies all positive values to +1. For example, a −0.2 value from the error estimator module 34 is amplified to −1 by the SGN circuit 50. This value is the corrected error value.

The error estimator module's output is also input to the error verifier module 36 (see FIG. 4) to determine if the value is within a specific range that is known to be potentially erroneous. In a data steam that consists of data inputs −1, 0, +1, a value of 0.5, or −0.5, does not indicate whether the values is −1, 0 or 1, and therefore those values (+0.5 and −0.5) are considered marginal. In one embodiment of the invention, the error verifier module 36 consists of an absolute value (ABS) circuit 51 and a comparator 53.

The value of the error estimator module's output is input to the ABS circuit 51, which makes the value of the error estimator module output a positive value under all circumstances. The output of the ABS circuit 51 is input to the comparator 53, where it is compared to a reference value, which in this example is 0.4. The output of the ABS circuit 51 is compared to a 0.4 value, in this example, because the comparator 53 is looking for a value from the error estimator 34 approximately equal to 0.5. If the output of the ABS circuit 51 is greater than 0.4, then the output of the comparator 53 is illustratively, high. The output of the comparator 53 is labeled as SIGNAL_A. If SIGNAL_A is high, then the value has been determined to be in the range of marginality. SIGNAL_A is input into the error correction module 40.

The transition detecting module 38 confirms if a data value transition has occurred. In one embodiment of the invention, the transition detecting module 38 includes an adder circuit 60, an absolute value (ABS) circuit 61, and a comparator 63. Two samples are taken of the input signal from the equalizer 25, with the first, e.g., S1 10, one-half a symbol period before T1 in FIG. 2 and the second, e.g., S2 12, one-half a symbol period after T1.

The data value of samples S1 10 and S2 12 are input to the adder circuit 60, which subtracts the data value before T1 from the value after T1. The output of the adder circuit 60 is input to the ABS circuit 61, which makes the resulting value a positive value under all circumstances. The output of the ABS circuit 61 is input to the comparator 63 and compared to a reference value, which in this example is 1.5. The comparator 63 uses a value of 1.5 because this would indicate that the data values of samples S1 10 and S2 12 are close to normal values like −1 or +1. The comparator 63 generates an output, which is labeled as SIGNAL_B. SIGNAL_B is high if the output from the ABS circuit 61 is greater than 1.5 and will be low if the output is less than 1.5. If the two adjacent phase samples are close to normal values such as +1 or −1, then the data transition within a symbol period is confirmed, and SIGNAL_B is output high. SIGNAL_B is input to the error correction module 40.

If SIGNAL_A and SIGNAL_B are both illustratively, high, then the correction module 40 issues a command to select the corrected value, which was output from the error estimator module 34 (see FIG. 4). Therefore, the data input from error correction module 40 overrides the tentative value, which was supplied initially by the decision circuit 32.

Figure 6:
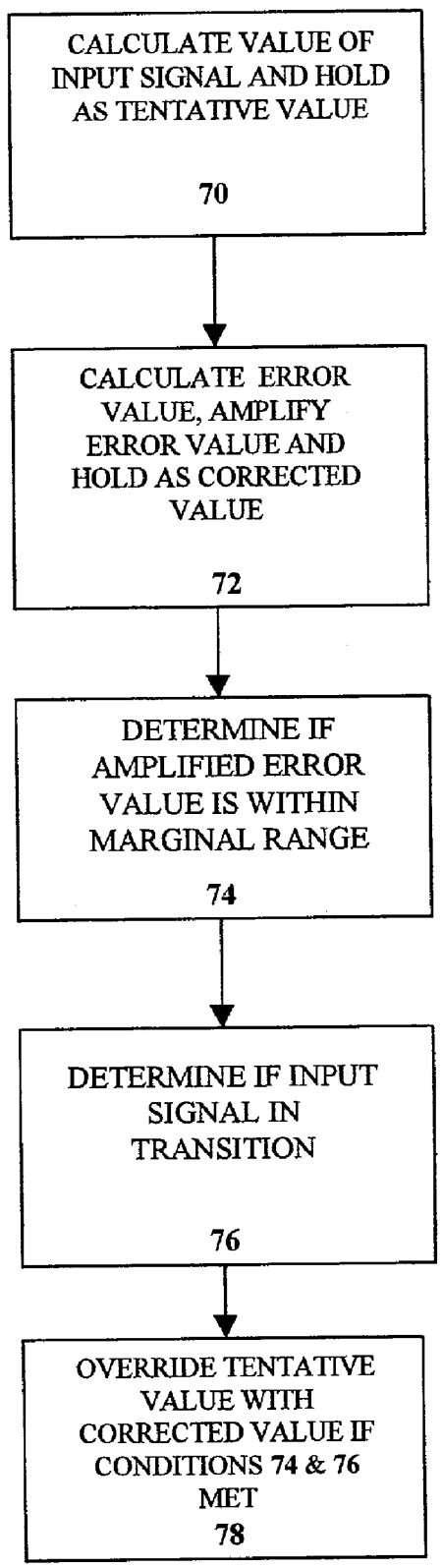
FIG. 6 illustrates a flow chart diagram of a decision operation according to an embodiment of the present invention.

FIG. 6 illustrates a flow chart diagram of a decision operation according to an embodiment of the present invention. A decision circuit 32 calculates 70 a value of an input signal and holds that value as a tentative value. An error estimator module 34 calculates 72 an error value, amplifies the error value and holds the amplified error value as a corrected value. An error verifier module 36 determines 74 whether the amplified error value is within a marginal range. A transition detecting module 38 determines 76 whether the input signal was in transition from a positive to negative state, or a negative to positive state during a symbol period. An error correction module 40 overrides 78 the tentative value with the corrected value if the amplified error value is within the marginal range and if the input signal was in transition.

The invention is particularly important when the transceiver is implemented in sampled signal processing using the combination of an analog-to-digital converter and a digital signal processor (DSP). The DSP approach is essential to enhancing the existing long haul analog T1 transceiver implementation to a quad or octel structure to avoid channel-to-channel cross talk in the silicon.

The present invention provides a method and system for error correction in a high-speed data transmission system where jitter, or phase error, can cause inter-symbol interference. A receiver includes a decision system. The decision system determines a tentative value of a sampled input signal. The decision system calculates an error value, amplifies the error value and holds it as a corrected error value. The decision system determines if the error value is within a marginal range and then determines if the sampled input signal is in a transition within a symbol period. If both of these conditions are met, then the decision system overrides the tentative value and substitutes the corrected value.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are intended to be embraced therein.

What is claimed is:

1. A method of error correction in a high-speed data transmission system, comprising:
    determining a value of an input signal at a decision timeframe and holding the value as a tentative value;
    estimating an error of the value of the input signal by subtracting the tentative value from the value of the input signal, amplifying the error of the value to create an amplified error, and holding the amplified error of the value as a corrected value to be utilized if the tentative value is to be corrected;
    deciding if the amplified error of the value is within a defined marginal range;
    determining if the input signal is involved in a transition from a positive to negative state or from a negative to positive state during a symbol period; and
    selecting the corrected value instead of the tentative value to be output if both the amplified error of the value is in the defined marginal range and the input signal is involved in the transition.

2. A method of error correction in the high-speed data transmission system according to claim 1, wherein two adjacent values of the input signal are calculated before and after the decision timeframe to determine if the input signal is involved in the transition.

3. A method of error correction in the high-speed data transmission system according to claim 2, wherein the two adjacent values are calculated one-half a symbol period before and after the decision timeframe.

4. A method of error correction in the high-speed data transmission system according to claim 3, wherein the two adjacent values are involved in a transition from −1 to +1, or from +1 to −1.

5. The method of claim 1, wherein said amplifying the error of the value to create the amplified error includes sending the error of the value through a signed Boolean circuit to amplify all negative values to −1 and to amplify all positive values to +1.

6. The method of claim 1, wherein said deciding if the amplified error of the value is within the defined marginal range utilizes an absolute value circuit making the amplified error of the value a positive number and a comparator to compare the positive number to a reference value.

7. A decision system in high-speed data transmission, comprising:

a data decision circuit to determine a value of an input signal at a decision instance and to hold the value of the input signal as a tentative value;

an error estimator module to determine an error value of the value of the input signal by subtracting the tentative value from the value of the input signal, to amplify the error value to create an amplified error of the value, and to hold the amplified error value as a corrected value to be utilized if the tentative values is to be corrected;

an error verifier module to determine whether the amplified error value is within a marginal range;

a transition detecting module, to determine whether the input signal was in transition from a positive to negative state, or a negative to positive state during a symbol period; and an error correction module to determine whether the tentative value should be overridden by the corrected value if both the amplified error of the value is within the marginal range and the input signal is involved in the transition.

8. The decision system according to claim 7, wherein adjacent sample values of the input signal before and after the decision instance are used to determine if the input signal is in the transition.

9. The decision system according to claim 8, wherein the adjacent sample values are calculated one-half a symbol period before and after the decision instance.

10. The decision system according to claim 8, wherein the transition detecting module includes an adder to add the adjacent sample values, an absolute value circuit to make positive the added adjacent sample values, and a comparator to compare the added adjacent sample values to a reference value.

11. A decision system for utilization in high-speed data transmission, comprising:

a data decision circuit to determine a value of an input signal at a decision instance and to hold the value of the input signal as a tentative value;

an error estimator module to determine an error value of the value by subtracting the tentative value from the value of the input signal, to amplify the error value to created an amplified error value, and to hold the amplified error value as a corrected value to be utilized if the tentative value needs to be corrected;

an error verifier module to determine whether the amplified error value is within a marginal range;

a transition detecting module, to determine whether the input signal was in a transition from a positive to negative state, or a negative to positive state during a symbol period; and an error correction module to select the corrected value instead of the tentative value if the error verifier module determines the amplified error value is outside the marginal range and the transition detecting module determines that the input signal was in the transition, wherein the error verifier module includes an absolute value circuit to make the amplified error value a positive number and a comparator to compare the positive number to a reference value.

12. A receiver utilized in high speed data transmission to output data values, comprising:

an analog-to-digital converter to receive an input signal and to output a sampled digital signal and a phase information; and a decision system to receive the sampled digital signal and to output a value from the receiver, wherein the decision system:

receives the sampled digital signal, calculates a value at a decision instance, and assigns a tentative value;

calculates an error value, of the input signal by subtracting the tentative value from the value of the input signal, amplifies the error value to create an amplified error of the value, and holds the amplified error of the value as a corrected value to be utilized if the tentative value is to be corrected;

determines if the error value is within a marginal range;

determines whether the input signal was in a transition from a positive to negative state, or a negative to positive state during a symbol period; and outputs the corrected value instead of the tentative value if the amplified error value is within the marginal range and if the input signal is in the transition during the symbol period.

13. The receiver according to claim 12, wherein adjacent sample values of the input signal before and after the decision instance are used to determine if the sampled digital signal is within the transition.

14. The receiver according to claim 13, wherein the adjacent sample values are calculated one-half a symbol period before and after the decision instance.

15. The receiver according to claim 12, wherein the input signal is received from a T1 data transmission system.

16. The receiver according to claim 15, wherein the T1 data transmission system includes a plurality of cascaded T1 links.

17. The receiver of claim 12, further including a phase detector to receive the value and the phase information and to output a detected phase information.

18. The receiver of claim 17, further including a loop filter to receive the detected phase information and to output filtered phase information.

19. The receiver of claim 18, further including an oscillator to receive the filtered phase information and to output a clock signal as a sampling clock for the analog-to-digital converter.

20. A receiver utilized in high speed data transmission to output data values, comprising:

an analog-to-digital converter to receive an input signal and to output a sampled digital signal and phase information; and a decision system to receive the sampled digital signal and to output a corrected value from the receiver, the decision system including, a data decision circuit to determine a value of the sampled digital signal at a decision instance and to hold the value of the sampled digital signal as a tentative value;

an error estimator module to determine an error value of the value of the sampled digital signal by subtracting the tentative value from the value of the sampled digital signal, to amplify the error value to created an amplified error value, and to hold the amplified error value as the corrected value to be utilized if the tentative value needs to be corrected;

an error verifier module to determine whether the amplified error value is within a marginal range;

a transition detecting module, to determine whether the sampled digital was in a transition from a positive to negative state, or a negative to positive state during a symbol period; and an error correction module to select the corrected value instead of the tentative value if the error verifier module determines the amplified error value is outside the marginal range and the transition detecting module determines that the input signal was in the transition, wherein the error verifier module includes an absolute value circuit to make the amplified error value a positive number and a comparator to compare the positive number to a reference value.

21. The receiver according to claim 20, wherein the transition detecting module includes an adder to add the adjacent sample values, an absolute value circuit to make positive the added adjacent sample values, and a comparator to compare the added adjacent sample values to a reference value.

22. A decision circuit, comprising:
a machine-readable storage medium; and
machine-readable program code, stored on the machine readable storage medium, the machine-readable program code having instructions, which when executed, cause the decision circuit to
calculate a value of an input signal at a decision instance and to hold the value as a tentative value,
calculate an error value, of the input signal by subtracting the tentative value from the value of the input signal, amplify the error value, to create an amplified error value, and hold the amplified error value as a corrected value to be utilized if the tentative value is to be corrected,
determine whether the amplified error value is within a marginal range,
determine whether the input signal was in a transition from a positive to negative state, or from a negative to positive state during a symbol period, and
decide whether the tentative value should be overridden by the corrected value if both the amplified error of the value is in the defined marginal range and the input signal is involved in the transition.

23. The decision circuit according to claim 22, wherein adjacent sample values of the input signal before and after the decision instance are used to determine if the input signal is in the transition.

24. The decision circuit according to claim 23, wherein the adjacent sample values of the input signal are calculated one-half a symbol period before and after the decision instance.

* * * * *